United States Patent [19]

Hodshire

[11] 4,321,767

[45] Mar. 30, 1982

[54] ICE FISHING APPARATUS

[76] Inventor: Vincent B. Hodshire, 2701 NE. Adams St., Peoria, Ill. 61603

[21] Appl. No.: 198,821

[22] Filed: Oct. 20, 1980

Related U.S. Application Data

[62] Division of Ser. No. 55,494, Jul. 6, 1979, Pat. No. 4,270,298.

[51] Int. Cl.³ ............................................. A01K 97/01
[52] U.S. Cl. ......................................................... 43/15
[58] Field of Search ...................................... 43/15, 16

[56] References Cited

U.S. PATENT DOCUMENTS

| | | | |
|---|---|---|---|
| 422,331 | 2/1890 | Bradford | 43/15 |
| 619,819 | 2/1899 | Zack | 43/15 |
| 2,744,351 | 5/1956 | Smith | 43/16 |
| 2,924,038 | 2/1960 | Dahlgren | 43/16 |
| 3,170,262 | 2/1965 | Hall | 43/15 |
| 3,174,247 | 3/1965 | Morgan | 43/15 |
| 3,271,891 | 9/1966 | Hancock | 43/15 |
| 3,474,561 | 10/1969 | McConkey | 43/16 |
| 3,798,821 | 3/1974 | Bybee | 43/15 |

*Primary Examiner*—Jimmy C. Peters
*Attorney, Agent, or Firm*—James R. Bell

[57] ABSTRACT

Fish can lightly nibble bait off a hook before a fisherman becomes aware and is able to react by firmly setting the hook in the fish. Apparatus is provided for reacting to a fish lightly nibbling at the bait in a manner sufficient to swiftly jerk the hook thus firmly setting it in the fish. The apparatus may be preset so as to avoid being set off or tripped while being cast out onto the surface of the water. Also, the apparatus may be modified for ice fishing. The preset may be adjusted to varying levels of sensitivity depending upon the type of fish to be caught or the type of bait being used.

5 Claims, 11 Drawing Figures

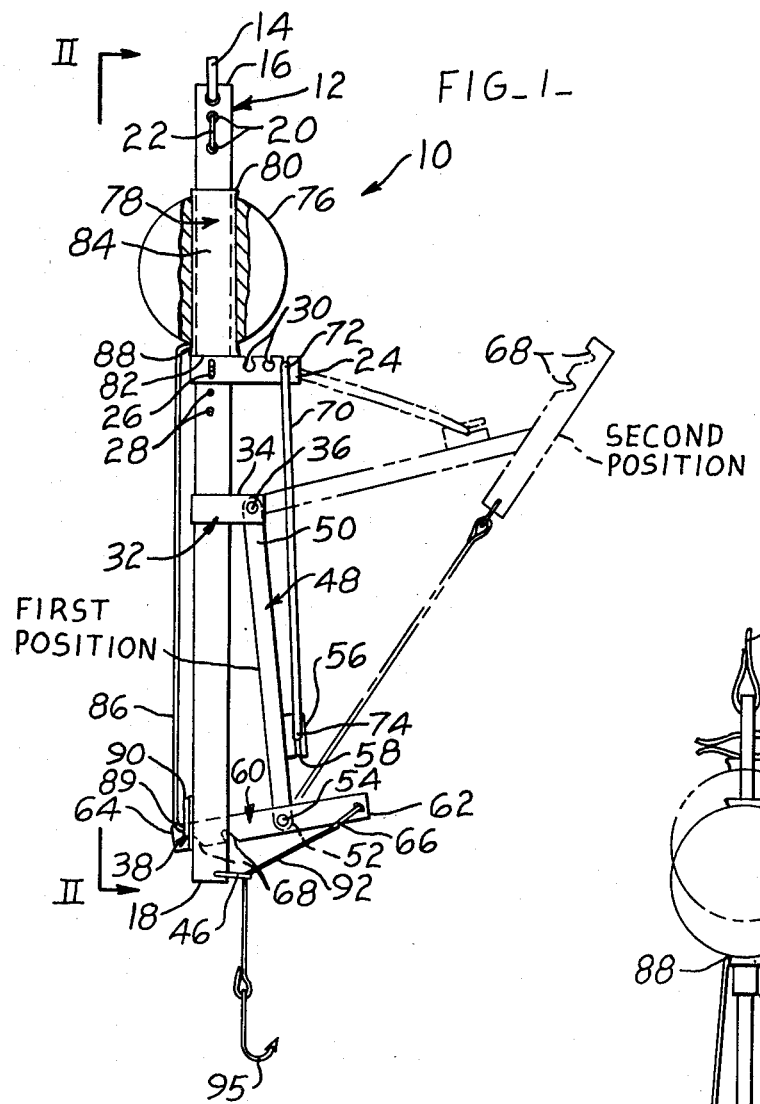
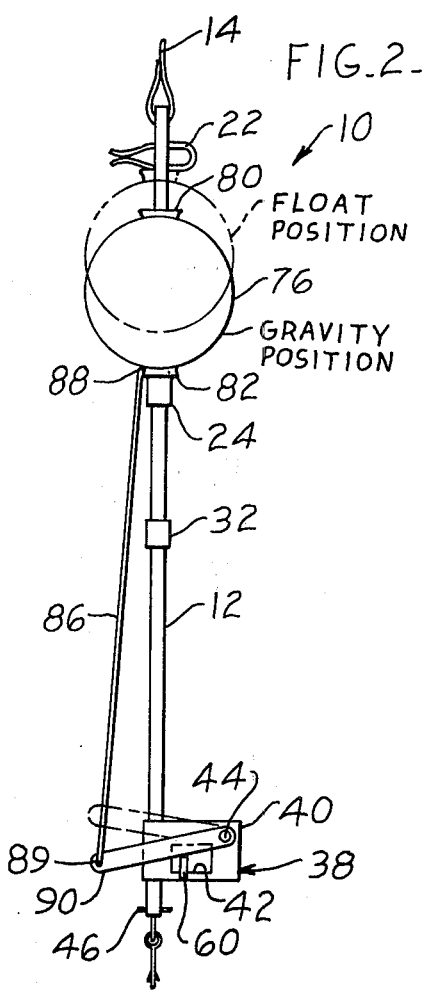
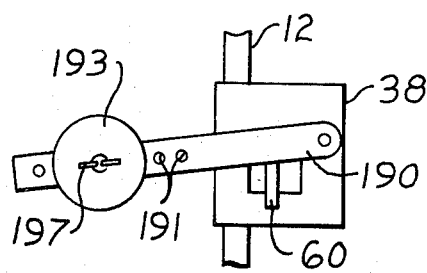

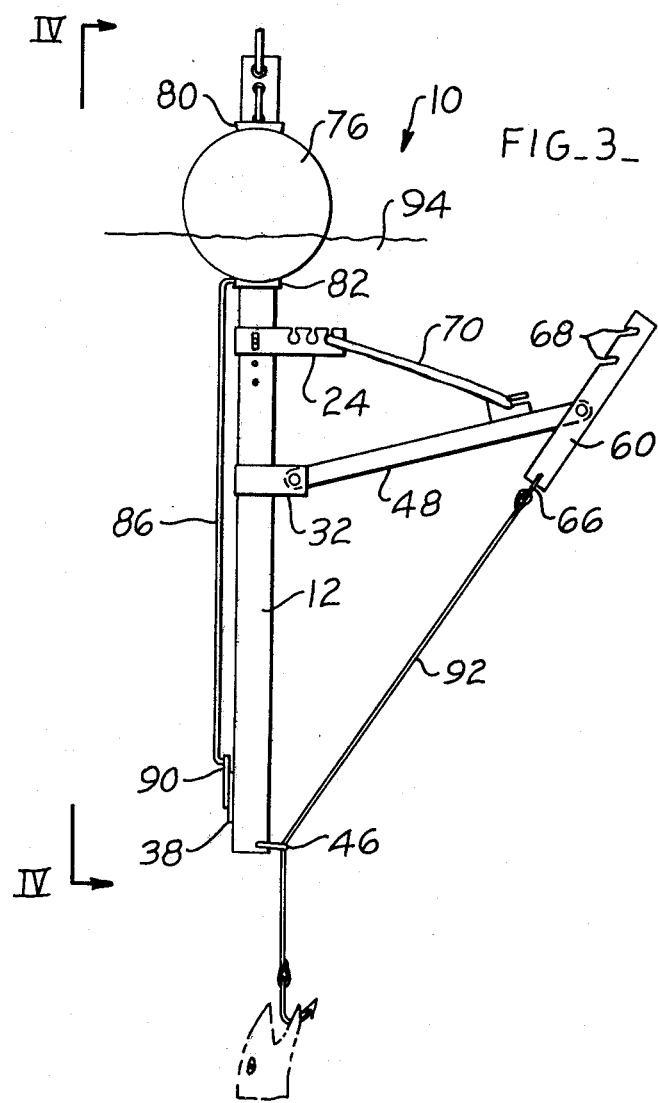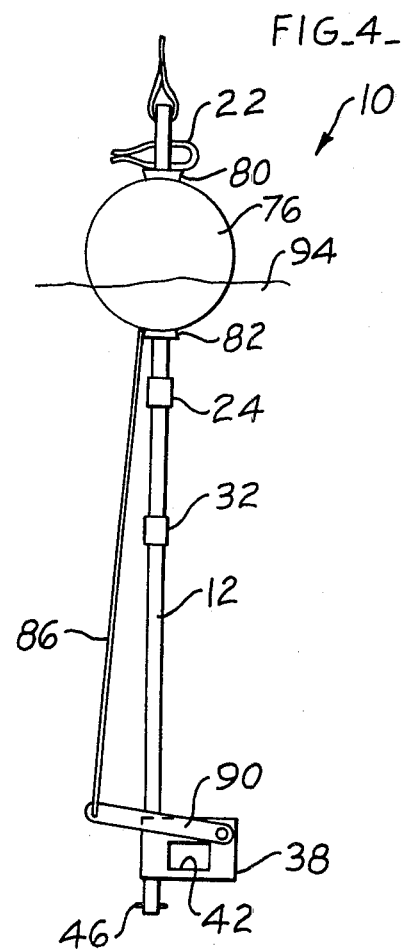

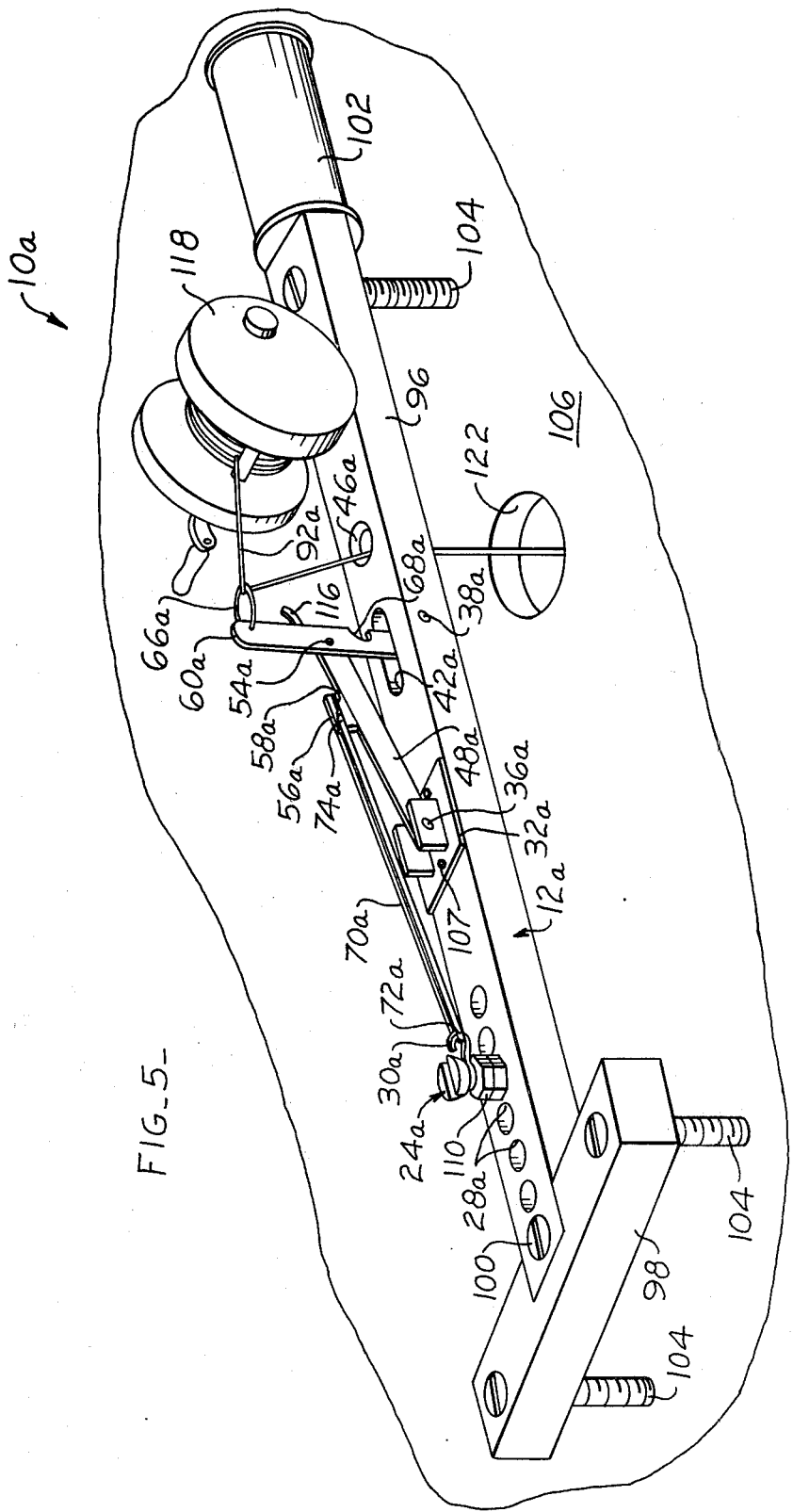

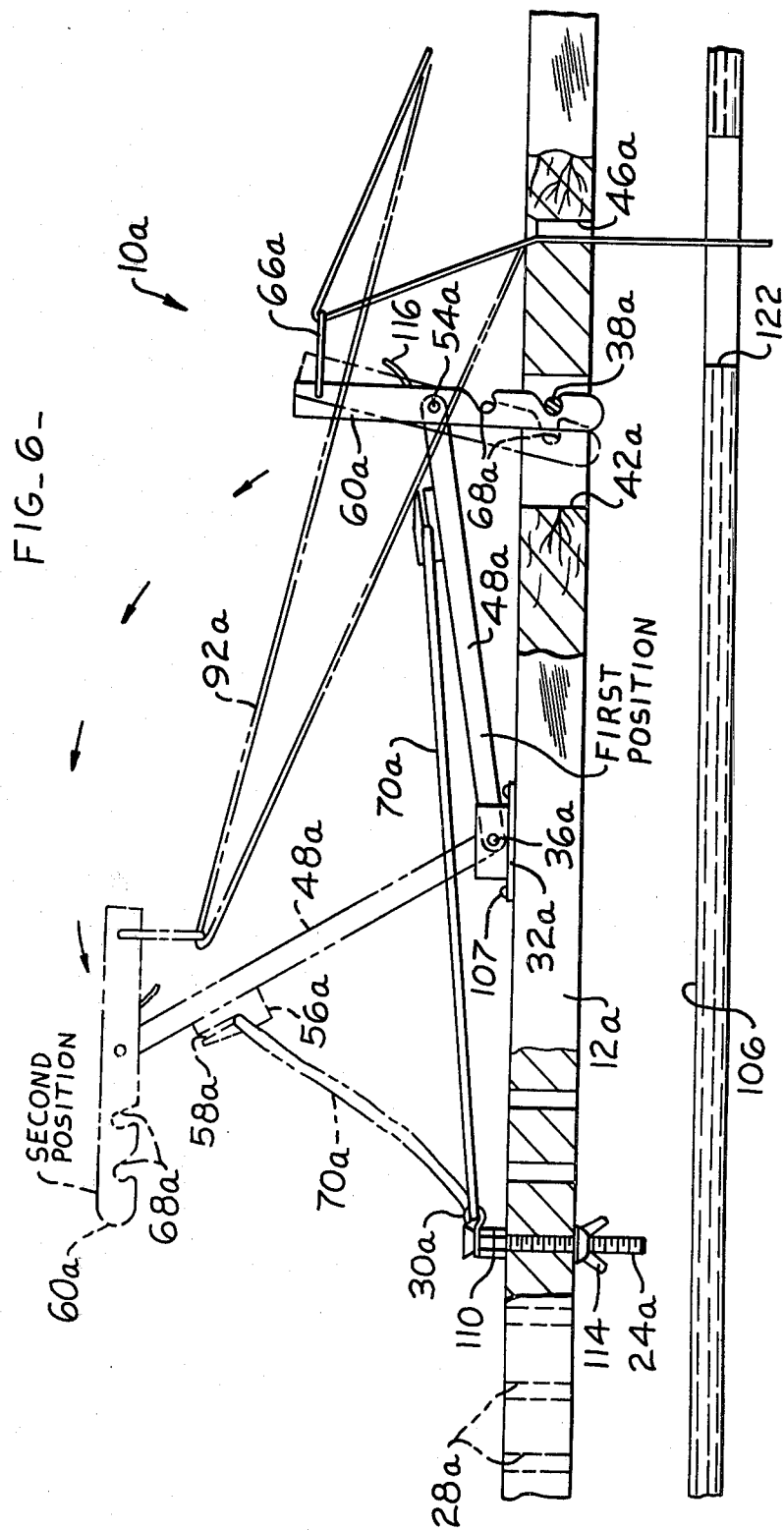

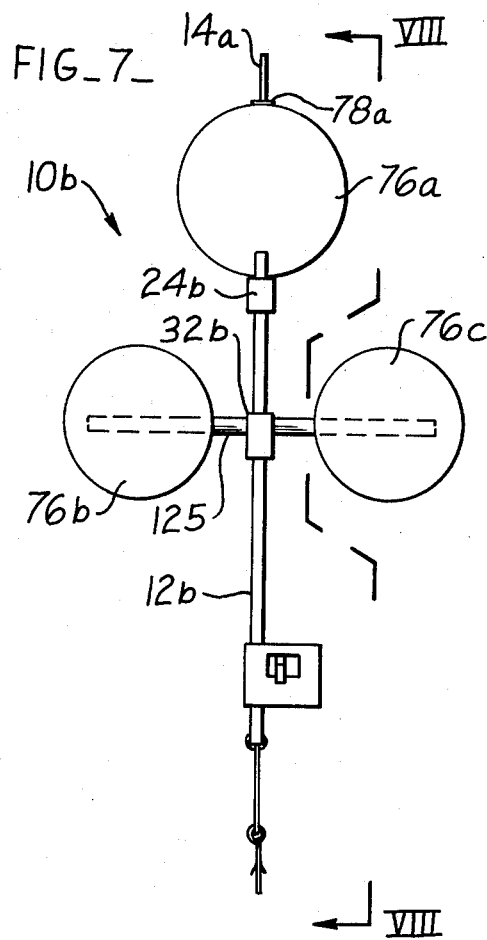
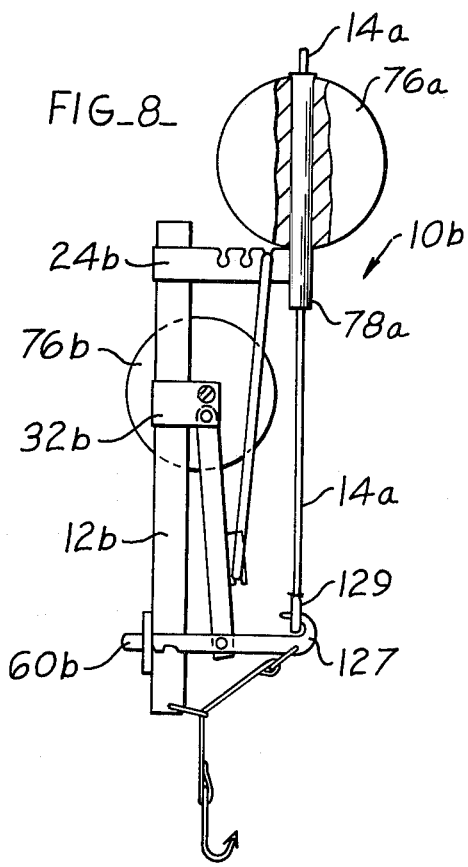
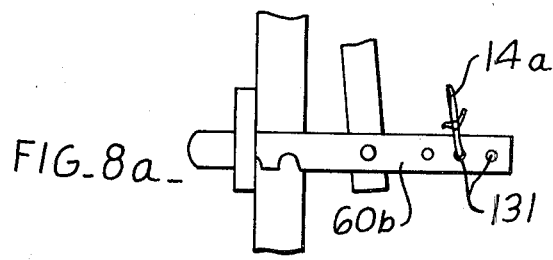
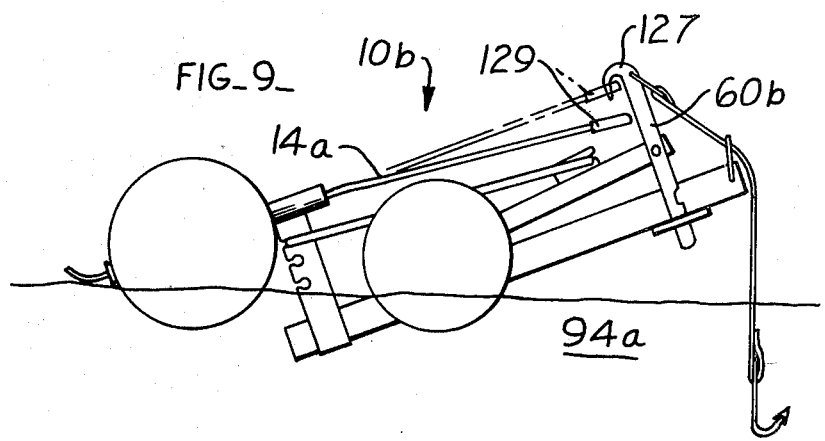

4,321,767

ICE FISHING APPARATUS

CROSS REFERENCE TO RELATED APPLICATIONS

This is a division of application Ser. No. 55,494, filed July 6, 1979, now U.S. Pat. No. 4,270,298 issued Jan. 2, 1981.

DESCRIPTION

1. Technical Field

This invention relates generally to fishing and more particulary to automatic hookers or catchers.

2. Background Art

Fishing apparatus of the type including spring loaded, presettable fish hook setting devices are often complicated, expensive and somewhat unreliable. Also, in a desire to provide such an apparatus which is sensitive enough to be sprung or set off in response to a fish lightly nibbling at a baited hook, the problem often arises of such devices being tripped or set off prematurely. Also, due to this sensitivity, such devices cannot be cast out onto the water once they have been preset. Casting such preset, spring loaded devices would be analogous to pre-setting a mousetrap and then tossing it into a corner. The result would most likely be, that the device would be tripped or set off and, as a result, would have to be preset.

In view of the above, it would be advantageous to provide a pre-settable, spring loaded, fish hooking apparatus which is inexpensive, reliable, non-complicated, and can be cast without being tripped, thus overcoming problems associated with the prior art.

DISCLOSURE OF INVENTION

In one aspect of the present invention, the problems pertaining to the known prior art, as set forth above, are advantageously avoided.

This is accomplished by providing a fishing apparatus including a main support having a movable first member and a trigger which can be retained in a first position and also be resiliently urged toward a second position.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a view illustrating the apparatus preset for water fishing;

FIG. 1a is a partial view illustrating a modification of the apparatus of FIG. 1;

FIG. 2 is a view taken along line 11—11 of FIG. 1;

FIG. 3 is another view illustrating the apparatus tripped when used for water fishing;

FIG. 4 is a view taken along the line IV—IV of FIG. 3;

FIG. 5 is a view illustrating the apparatus modified for ice fishing;

FIG. 6 is another view of the apparatus of FIG. 5;

FIG. 7 is a view illustrating the apparatus modified to be supported above the water surface;

FIG. 8 is a view taken along the line VIII—VIII of FIG. 7;

FIG. 8a is a partial view illustrating a modification of the apparatus of FIG. 8; and FIG. 9 is a view illustrating the apparatus supported above the water surface.

Best Mode For Carrying Out The Invention

A fishing apparatus may be used for water fishing, as illustrated in FIGS. 1-4 and generally designated 10, or in the alternative, may be used for ice fishing as illustrated in FIGS. 5 and 6 and generally designated 10a.

Apparatus 10 includes a main support member 12 which includes a flat, lightweight rod formed of a suitable metal, having a first end 16 and a second end 18. A plurality of holes 20 are formed in member 12 adjacent first end 16. Holes 20 accommodate a cotter pin 22 which may function as a stop as will be discussed later.

A first plate 24 is formed of a suitable, lightweight metal and is positionably, or adjustably, mounted on member 12 at a position spaced from first end 16. Plate 24 is mounted on member 12 by a cotter pin 26, or the like and includes an extension 25 doubled back about member 12. Pin 26 extends through plate 24 and through one of the holes 28 formed in member 12 and then through extension 25. In this manner, plate 24 is firmly connected to member 12 but may be positioned relative to holes 28. A plurality of slots 30 are formed in plate 24 at varying distances from member 12. Plate 24 may also function as a stop as will be discussed later.

A second plate 32 is also formed of a suitable, lightweight metal and is fixedly mounted on member 12 such as by welding, soldering, or the like. Plate 32 has an extended portion 34 and a pivot pin 36.

A third plate 38 is also formed of a suitable, lightweight metal and is fixedly mounted on member 12 at right angles relative to plates 24,32. Plate 38 is mounted on member 12 such as by welding, soldering, or the like. Plate 38 includes an extended portion 40 having an opening 42 formed therethrough. Also, a pivot pin 44 is mounted in plate 38.

A guide 46 is connected to member 12 adjacent second end 18. Guide 46 is a closed loop formed of a suitable, lightweight metal.

A first member 48 has a first end 50 and a second end 52. Member 48 is also a flat, lightweight rod formed of a suitable metal similar to member 12. First end 50 is pivotally connected to plate 32 at pivot pin 36. Second end 52 includes a pivot pin 54. A plate 56 is fixedly connected to member 48 such as by welding, soldering, or the like. Plate 56 includes a slot 58.

A trigger 60 has a first end 62 and a second end 64. Trigger 60 is a flat, lightweight rod formed of a suitable metal similar to member 12. Trigger 60 is pivotally connected to member 48 at pivot pin 54. First end 62 includes a guide 66 connected thereto. Guide 66 is a closed loop formed of a suitable, lightweight metal. Second end 64 includes at least one, and preferably a plurality of, notches 68.

Plate 38 functions as a means for retaining member 48 and trigger 60 in a first (solid line) position as illustrated in FIG. 1. This is accomplished by inserting second end 64 through opening 42 so that one of the notches 68 engages plate 38.

Resilient means, preferably a rubber band 70, having a first end 72 engaged in one of the slots 30, and having a second end 74 engaged in slot 58, functions as a means for resiliently urging member 48 and trigger 60 toward a second (dotted line) position as illustrated in FIG. 1.

A float 76, is preferably a spherical member formed of an expanded synthetic resinous material sold under the mark STYROFOAM and includes a cylindrical insert 78 extending therethrough. Insert 78 includes a first flanged end 80 and a second flanged end 82. A cylindrical barrel portion 84 interconnects the flanged ends 80,82. Insert 78 is of a construction sufficient for being movably mounted on member 12 between a gravity position wherein flanged end 82 engages plate 24, and a float position wherein flanged end 80 engages pin 22.

Means are provided for locking trigger 60 in the first position. Such a means includes a substantially rigid rod or arm 86 having a first end 88 fixedly secured to flanged end 82, and a second end 89 pivotally connected to a pivot member 90 which is pivotally attached to plate 38 at pivot pin 44, see FIG. 2. In this manner, rod 86 and pivot member 90 are connected to move with float 76 between the gravity and float positions. When float 76 is in the gravity position, the weight of float 76 urges rod 86 and pivot arm 90 against trigger 60 so that notch 68 is locked into engagement with plate 38 (see FIG. 1). As can be seen in FIG. 2, when float 76 is in the float position, rod 86 and pivot arm 90 are urged upwardly out of engagement with trigger 60 permitting trigger 60 to have its notch 68 disengaged from plate 38. If preferred, a modified pivot member 190, FIG. 1a, may be elongated and have a plurality of holes 191 for selectively positioning a weight 193 by the use of a cotter pin 197. Float 76 is not connected to arm 190 when weight 193 is used. Weight 193 will limit premature tripping of trigger 60 when a heavy piece of bait is used.

A fishing line 14 is connected to first end 16 and is also connected to a fishing pole (not shown). A fishing line 92 is connected to guide 66 and extends through guide 46 to a hook 95. FIGS. 3 and 4 illustrate float 76 in the float position due to apparatus 10 being in water 94. As previously discussed, pivot arm 90 is disengaged from trigger 60 when float 76 is in the float position, and as a result, force exerted on line 92 acts on trigger 60 at guide 66 and pivots notch 68 about pin 54 and out of engagement with plate 38 thus permitting resilient means 70 to act on member 48 and trigger 60 and to swiftly jerk line 92 through guide 46 thus setting attached hook 95.

Similar to water fishing apparatus 10, ice fishing apparatus 10a, FIGS. 5 and 6, includes a main support member 12a which is preferably formed of wood members 96,98 joined in a "T" shape at bolt 100 and having a handle 102. Support legs such as bolts 104 extend through main support 12a for supporting apparatus 10a on an ice surface 106.

A first member 48a is pivotally connected to member 12a at pivot pin 36a and plate 32a which is suitably attached to member 12a by wood screws 107, or the like. A plate 56a is suitably attached to member 48a and includes a slot 58a.

A trigger 60a is pivotally connected to member 48a at pivot pin 54a and includes a loop-type guide 66a and notches 68a. A pin 38a, attached to member 12a functions as a means for retaining member 48a and trigger 60a in a first (solid line) position as illustrated in FIGS. 5 and 6. This is accomplished by inserting trigger 60a through an opening 42a in member 12a so that one of the notches 68a engages pin 38a.

A bolt 24a is inserted through one of a plurality of holes 28a in member 12a. Bolt 24a is thus adjustably mounted on member 12a. For added adjustment, nuts 110 can be used to adjust the distance between a hook 30a and member 12a. A wing nut 114 secures bolt 24a to member 12a.

A resilient means such as a rubber band 70a includes a first end 72a engaged in hook 30a, and a second end 74a engaged in slot 58a. Resilient means 70a resiliently urges member 48a and trigger 60a from the first position to a second (dotted line) position as illustrated in FIG. 6.

A probe 116 is attached to and extends from trigger 60a to be used for "tip-up" fishing.

A fishing reel 118 is attached to member 12a and a fishing line 92a extends from reel 118 through guide 66a and also through another guide 46a which is a hole formed through member 12a. Line 92a extends through hole 122 formed in ice surface 106. A force exerted on line 92a acts at guide 66a and pivots trigger 60a about pin 54a thus pivoting notch 68a out of engagement with pin 38a and permitting resilient means 70a to act on member 48a and trigger 60 and to swiftly jerk line 92a through guide 46a thus setting an attached hook (not shown).

Further, apparatus 10b (FIGS. 7,8) can be provided with means for supporting the apparatus 106 substantially above the surface of water 94a, such means being a plurality of floats 76a,ιb,76c connected to main support member 12b. Float 76a is secured to plate 24b by a tubular insert 78a which extends through float 76a. Floats 76b,76c are mounted on a rod 125 which is secured to plate 32b.

A catch 127 is attached to trigger 60b. A fishing line 14a, connected to a fishing pole (not shown), extends through insert 78a. A loop 129, attached to fishing line 14a is engaged with catch 127 and automatically disengages with catch 127 due to gravity when apparatus 10b assumes a horizontal position supported by floats 76a,76b,76c, substantially above the surface of water 94a, as illustrated in FIG. 9. If preferred, fishing line 14a can be attached directly to trigger 60b in any one of holes 131 provided therein, as illustrated in FIG. 8a.

Industrial Applicability

With the parts assembled as set forth above it can be seen that with the water fishing apparatus 10 connected to a fishing pole (not shown) by fishing line 14, hook 95 is baited. Apparatus 10 is then preset by lifting float 76 upward on member 12 until flanged end 80 engages pin stop 22. As a result, rod 86 will be moved also, and will pivot the arm 90 upward exposing opening 42. Trigger 60 may then be inserted through opening 42 and one of the notches 68 engaged with plate 38. Float 76 is then released and moves downwardly on member 12 until pivot arm 90 rests on trigger 60 (the gravity position) thus locking trigger 60 and the associated member 48 in the first position. The apparatus 10 can now be cast out onto the surface of the water without tripping the trigger 60.

When apparatus 10 is afloat on the surface of the water 94, float 76 is moved upwardly relative to member 12 into the float position and, as a result, rod 86 and pivot arm 90 also move upwardly disengaged from trigger 60. Most of the apparatus 10 is submerged below the surface of water 94 as illustrated in the FIGURES, and trigger 60 is now free to be released to the second position when a fish strikes hook 95.

It should be understood that apparatus 10 can be used without float 76 when a fisherman desires to do some deep water fishing. Thus, by removing cotter pin 22, float 76 and rod 86 may be removed. Thereafter, hook 95 can be baited, trigger 60 set by engaging notch 68 and plate 38, and the preset apparatus 10 can be slowly lowered into the depths of water 94, free to be released when a fish strikes hook 95.

It should also be understood that the sensitivity of trigger 60 can be altered in several ways. Most obvious of course would be to vary the size and strength of resilient member 70. Also, the use of various notches 68 and the engagement of resilient member 70 in the various slots 30 of plate 24 will vary the sensitivity of trigger 60. Further, moving plate 24 relative to member 12 by positioning in holes 28 will vary sensitivity.

Similarly, ice fishing device 10a, which operates without a float, can be preset for fishing. After a hook is baited, one of the notches 68a is engaged with pin member 38a. Line 92a can be lowered through ice hole 122 and trigger 60a is free to release when a fish strikes, as described above.

Sensitivity of trigger 60a can be varied by varying the size and strength of resilient member 70a; by moving bolt 24a to the various hole positions 28a; by adjusting the distance of hook 30a relative to support 12a; and by using the various notches 68a.

Apparatus 10a is supported by legs 104 on the surface of the ice 106 as illustrated in FIG. 5. When it is desired to use apparatus 10a for "tip-up" fishing, as it is referred to, line 92a can be removed from loop 66a, and an overhand knot loop formed in line 92a. The overhand knot loop can then be engaged with probe 116 with line 92a extending through guide 46a and through ice hole 122 into the water beneath the ice surface 106. Force exerted on line 92a will act on probe 116, pivoting trigger 60a for disengagement of notch 68a and pin member 38a. Thus, trigger 60a will be released to the second position.

It is anticipated that many modifications, variations and substitutions of materials may be made to form apparatus which structurally and functionally may fall within the scope of this invention.

The foregoing has described a fishing apparatus which may be preset for automatic hooking and which can avoid being set off or tripped while being cast out onto the surface of the water. Also, the apparatus can be modified for ice fishing.

Other aspects, objects and advantages of this invention can be obtained from a study of the drawings, the disclosure and the appended claims.

I claim:
1. A fishing apparatus comprising:
   a main support member;
   a first member pivotally connected at a first end to said main support member and movable between first and second positions;
   a trigger member pivotally connected to a second end of said first member, said trigger having a plurality of notches formed therein;
   means for retaining said trigger and said first member in said first position, said means including a pin connected to said main support for engagement with said notches in said trigger; and
   means for resiliently urging said trigger and said first member toward said second position, said means for urging being connected between said first and second ends of said first member, and extending adjacent said first end of said first member and further being adjustably connected to said main support.
2. The apparatus of claim 1, including:
   a plurality of support legs connected to said main support.
3. The apparatus of claim 1, including a probe extending from said trigger.
4. The apparatus of claim 2, including:
   a fishing reel connected to said main support.
5. The apparatus of claim 4, including:
   said trigger having a first guide;
   said main support having a second guide; and
   a fishing line extending from said reel through said first and second guides.

* * * * *